UNITED STATES PATENT OFFICE.

LOUIS A. HOFMAN, OF ST. LOUIS, MISSOURI.

COMPOSITION FOR MAKING WALL-PLASTER AND PLASTER BUILDING-BLOCKS.

1,211,445.          Specification of Letters Patent.        Patented Jan. 9, 1917.

No Drawing.       Application filed June 12, 1916.    Serial No. 103,191.

*To all whom it may concern:*

Be it known that I, LOUIS A. HOFMAN, a resident of the city of St. Louis, State of Missouri, have made a new and useful Improvement in Compositions for Making Wall-Plaster and Plaster Building-Blocks, of which the following is a specification.

My composition consists of the following ingredients, combined in substantially the proportions stated, viz:

| | |
|---|---|
| Ordinary clay | 70 pounds |
| Ordinary lime | 14 pounds |
| Gypsum | 15 pounds |
| Pulverized glass | 1 pound |
| Muriatic acid | 2 ounces |

These ingredients in substantially said proportions to each hundred pounds of the mixture are deposited in a crucible or receptacle in their natural form and subjected to a red heat of about 350 degrees Fahrenheit for a period of about six hours. The ingredients are to be thoroughly and continually minged by agitation during the heating process. The action of the heat in this process causes various chemical changes in the ingredients. The action of the muriatic acid causes the ingredients to thoroughly mix. The addition of the gypsum and pulverized glass tends to harden the composition, while the small amount of lime gives the composition its adhesive qualities. After the aforesaid heating process, the composition is released from the receptacle and after cooling is in the form of dry particles which readily submit to a grinding or pulverizing process. After being ground or pulverized the composition is ready for use, but it gives more satisfactory results if allowed to age for four or five days.

This composition when mixed with a proper amount of water and sand, and coloring of any desired shade, is ready to be applied to the wall or ceiling; or the above mixture may be poured into molds to make any sized building- or partition-block.

The plaster made from my composition sets in about three or four hours, but the setting time may be prolonged by adding the usual retarder.

The plaster can be used with or without hair or fiber according to the use to which the plaster is put.

My plaster has the advantage over other plaster compositions on the market in that it can be more cheaply made than other plasters I am aware of, owing to the proportionately large amount of cheap clay used in its making.

My plaster assumes an unusually hard and smooth surface, and will not ordinarily crack or break when pierced with nails or screws.

I claim:

The herein described composition for making hard wall plaster and building blocks, consisting of ordinary clay seventy pounds, ordinary lime fourteen pounds, gypsum fifteen pounds, pulverized glass one pound, and muriatic acid two ounces, substantially as described.

LOUIS A. HOFMAN.

Witnesses:
     ED F. STOCKHO,
     FREDK. S. SMITH.

Copies of this patent may be obtained for five cents each, by addressing the "Commissioner of Patents, Washington, D. C."